US011023140B2

(12) United States Patent
Lendvay

(10) Patent No.: US 11,023,140 B2
(45) Date of Patent: Jun. 1, 2021

(54) NVDIMM WITH REMOVABLE STORAGE

(71) Applicant: Micron Technology, Inc., Boise, ID (US)

(72) Inventor: William A. Lendvay, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/850,588

(22) Filed: Dec. 21, 2017

(65) Prior Publication Data

US 2019/0196725 A1 Jun. 27, 2019

(51) Int. Cl.
*G06F 3/06* (2006.01)

(52) U.S. Cl.
CPC ............ *G06F 3/0619* (2013.01); *G06F 3/065* (2013.01); *G06F 3/0656* (2013.01); *G06F 3/0679* (2013.01); *G06F 3/0685* (2013.01); *G06F 3/0688* (2013.01); *G06F 3/0653* (2013.01)

(58) Field of Classification Search
CPC ...... G06F 3/0619; G06F 3/065; G06F 3/0656; G06F 3/0679; G06F 3/0685; G06F 3/0688; G06F 3/0653
See application file for complete search history.

(56) References Cited

U.S. PATENT DOCUMENTS 6,587,909 B1 * 7/2003 Olarig ................ G06F 13/4081 710/302
9,348,705 B1 * 5/2016 Wu .................... G06F 11/1666
9,496,633 B1 * 11/2016 Huang .................... G06F 1/185
2002/0002690 A1 * 1/2002 Lai ...................... G06F 11/1666 714/6.11
2005/0067675 A1 * 3/2005 Shepard ................ G03F 7/0017 257/622
2009/0201164 A1 * 8/2009 Weksler ............ H04M 1/72527 340/669

(Continued)

OTHER PUBLICATIONS

"Micron Introduces Persistent Memory Solution That Combines DRAM Performance With NAND Flash Reliability to Address Big Data Challenges" press release of Nov. 10, 2016 http://investors.micron.com/news-releases/news-release-details/micron-introduces-persistent-memory-solution-combines-dram (Year: 2016).*

(Continued)

*Primary Examiner* — William E. Baughman
*Assistant Examiner* — Janice M. Girouard
(74) *Attorney, Agent, or Firm* — Perkins Coie LLP

(57) ABSTRACT

Several embodiments of memory devices and systems with removable storage are disclosed herein. In one embodiment, a non-volatile dual in-line memory module (NVDIMM) includes a controller and a non-volatile memory slot configured to operatively connect a removable non-volatile memory device to the controller. The NVDIMM further comprises one or more volatile memories operatively connected to the controller. The controller is configured to backup content on the one or more volatile memories onto a removable non-volatile memory device operatively connected to the controller via the non-volatile memory slot. In some embodiments, the NVDIMM further comprises dedicated hardware configured to direct the controller to backup content on the one or more volatile memories onto a removable non-volatile memory device operatively connected to the controller via the non-volatile memory slot.

18 Claims, 4 Drawing Sheets

(56) References Cited

U.S. PATENT DOCUMENTS

2010/0005219 A1* 1/2010 Loughner ................ G11C 7/02
711/5
2011/0176175 A1* 7/2011 Panshin ............... B41J 2/17546
358/1.16
2013/0019076 A1* 1/2013 Amidi ................. G06F 11/1441
711/162
2016/0112195 A1* 4/2016 Jochheim .................. G06F 8/35
713/189
2016/0327923 A1* 11/2016 Papenbreer .......... G05B 19/048
2017/0160956 A1* 6/2017 Chinnakkonda Vidyapoornachary .. G11C 5/04
2017/0228292 A1* 8/2017 Akbulut .............. G06F 11/1458
2018/0004422 A1* 1/2018 Riley .................... G06F 3/0619
2018/0203816 A1* 7/2018 Cho ........................ G06F 13/28
2019/0012263 A1* 1/2019 Jenne .................. G06F 12/0804

OTHER PUBLICATIONS

A screenshot of searchstoreage.techtarget.com/definition/DIMM taken Aug. 31, 2017 describing DIMMs (Year: 2017).*
Merriam-Webster thesaurus for buttons taken from https://www.merriam-webster.com/thesaurus/button (Year: 2020).*

* cited by examiner

NVDIMM WITH REMOVABLE STORAGE

TECHNICAL FIELD

The disclosed embodiments relate to memory devices, and, in particular, to non-volatile dual in-line memory modules with removable storage.

BACKGROUND

Memory devices may be provided as modules with standard physical formats and electrical characteristics to facilitate easier installation and deployment across multiple systems. One such module is a dual in-line memory module (DIMM), which is frequently used to provide volatile memory such as DRAM to computing systems. Although DRAM can be fast, and therefore well-suited to use as the main memory of computing systems, it is a volatile memory format and thus requires the continuous application of power to maintain the data stored therein. To address this limitation, other modules can provide both volatile memory (for use as the main memory of a system) and non-volatile memory (for backing up the volatile memory in case of power loss) in a single module. One such module is a non-volatile dual in-line memory module (NVDIMM).

DETAILED DESCRIPTION

As described in greater detail below, the present technology relates to memory devices and system having non-volatile dual in-line memory modules with removable storage. Numerous specific details are discussed to provide a thorough and enabling description for embodiments of the present technology. A person skilled in the art, however, will understand that the technology may have additional embodiments and that the technology may be practiced without several of the details of the embodiments described below with reference to FIGS. 1-4. In other instances, well-known structures or operations often associated with memory devices are not shown, or are not described in detail, to avoid obscuring other aspects of the technology. In general, it should be understood that various other devices and systems in addition to those specific embodiments disclosed herein may be within the scope of the present technology. For example, in the illustrated embodiments below, the memory devices and systems are primarily described in the context of non-volatile dual in-line memory modules compatible with DRAM and flash (e.g., NAND and/or NOR) storage media. Memory devices and systems configured in accordance with other embodiments of the present technology, however, can include memory modules compatible with other types of storage media, including PCM, RRAM, MRAM, read only memory (ROM), erasable programmable ROM (EPROM), electrically erasable programmable ROM (EEROM), ferroelectric, magnetoresistive, and other storage media, including static random-access memory (SRAM).

Figure 1:
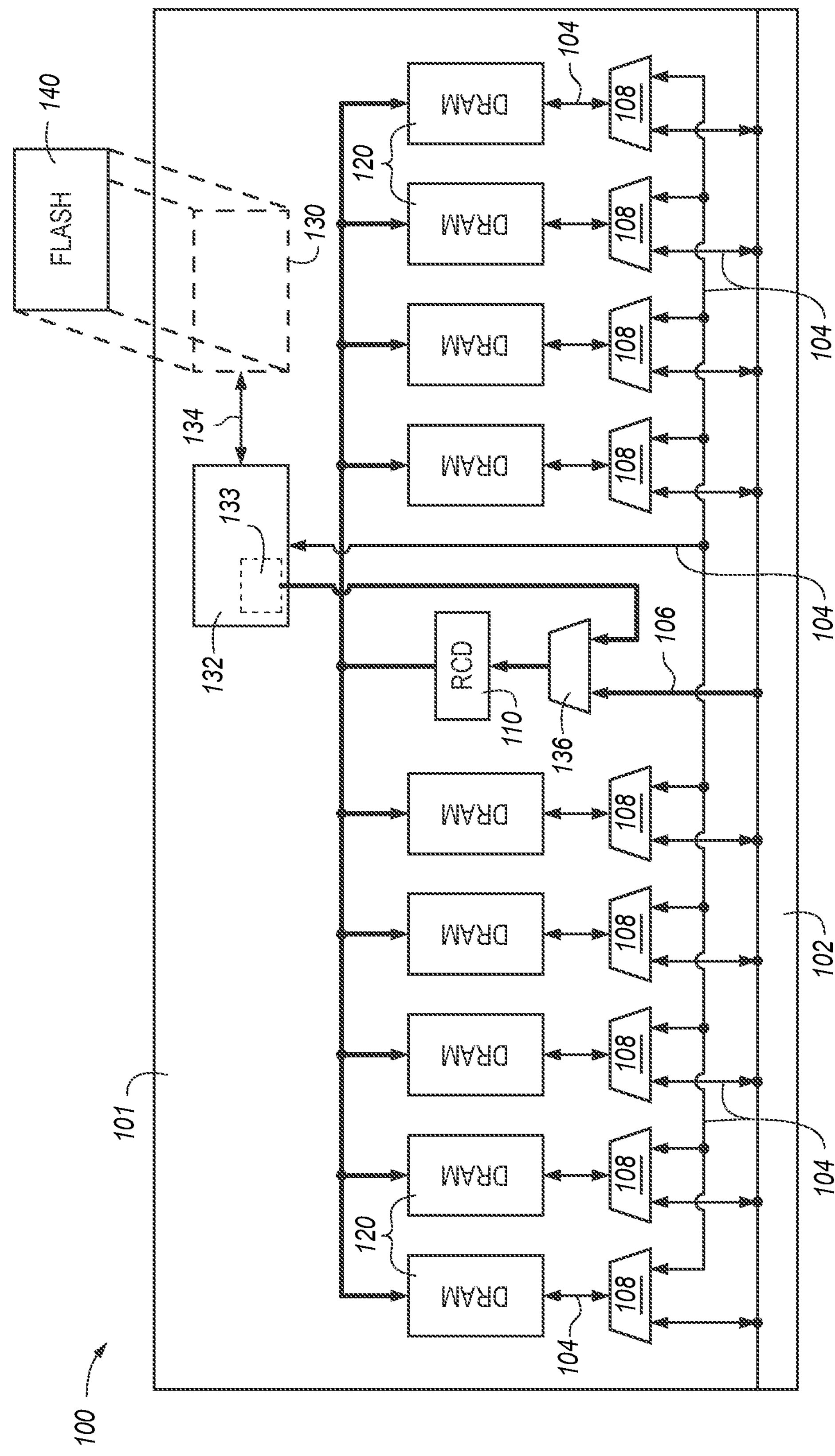
FIG. 1 is a schematic diagram of a non-volatile dual in-line memory module configured in accordance with an embodiment of the present technology.

FIG. 1 is a schematic diagram of a non-volatile dual in-line memory module (NVDIMM) 100 configured in accordance with an embodiment of the present technology. As shown, the NVDIMM 100 includes both a plurality of DRAM memories 120 (e.g., memory dies, memory chips, memory packages or the like) and a non-volatile memory slot 130 (e.g., a memory socket) configured to receive a removable non-volatile memory device 140 (e.g., a flash memory device). The NVDIMM 100 includes an edge connector 102 along an edge of a substrate 101 (e.g., a printed circuit board (PCB) or the like) of the NVDIMM 100 for connecting a data bus 104 and a command/address bus 106 to a host device (not shown). The data bus 104 connects the DRAM memories 120 to the edge connector 102 and receives data signals from and transmits data signals to a connected host device during memory access operations (e.g., reads and writes). The NVDIMM 100 can further include a registering clock driver (RCD) 110 that receives command/address signals from the command/address bus 106 and generates memory command/address signals for the DRAM memories 120.

The NVDIMM 100 further includes a controller 132 for controlling the non-volatile memory device 140 and performing memory management operations, such as power loss detection, backup from the DRAM memories 120 to the non-volatile memory device 140, and restore from the non-volatile memory device 140 to the DRAM memories 120. The controller 132 may include a connection to the edge connector 102 (not shown) to facilitate detection of a power loss event (e.g., by monitoring a voltage of a power supply pin, or via a dedicated pin for sending commands from a connected host device to the controller 132).

The controller 132 can be connected to the non-volatile memory device 140 (i.e., via the non-volatile memory slot 130) by a non-volatile bus 134 and to the DRAM memories 120 by the data bus 104. In this regard, the data bus 104 may include a number of data multiplexers 108 to facilitate connecting the DRAM memories 120 to both the edge connector 102 (e.g., for receiving data signals from and transmitting data signals to a connected host device) and to the controller 132 (e.g., for reading data signals from the DRAM memories 120 during a backup operation and transmitting data signals to the DRAM memories 120 during a restore operation). In another embodiment, the multiplexers 108 may be internal to the DRAM memories 120. The controller 132 is further connected to the RCD 110, in order to provide command/address signals to the DRAM memories 120 during backup and restore operations. In this regard, the controller 132 can include a driver 133 for sending command/address signals to the RCD 110, through a command/address multiplexer 136 configured to connect the RCD 110 to both the edge connector 102 and the driver 133 of the controller 132.

The non-volatile memory slot 130 is configured to receive and connect the non-volatile memory device 140 to the controller 132 via the non-volatile bus 134. In accordance with an embodiment of the present technology, the non-volatile memory slot 130 (e.g., the memory slot) can be configured to receive (e.g., be compatible with) flash (e.g., NAND and/or NOR) memory storage media. In other embodiments, the non-volatile memory slot 130 can configured to receive (e.g., be compatible with) PCM, RRAM, MRAM, read only memory (ROM), erasable programmable ROM (EPROM), electrically erasable programmable ROM (EEROM), ferroelectric, magnetoresistive, and other non-volatile storage media. Unlike conventional NVDIMM technology, only the non-volatile memory slot 130 is soldered to the substrate 101 of the NVDIMM 100. The non-volatile memory device 140, by contrast, is removable from (e.g., transportable to/from, relocatable to/from, etc.) the NVDIMM 100 as shown by phantom lines in FIG. 1. In this regard, the non-volatile memory device 140 can be a standard device (e.g., a secure digital (SD) card (mini, micro, high capacity, etc.), an universal flash storage (UFS) card, a compact flash (CF) card, a MultiMediaCard (MMC), a memory stick, a SmartMedia card, a xd-Picture card, a smart card, a universal serial bus, and/or other types of datacards). In other embodiments and as described in greater detail below, the non-volatile memory device 140 can be, for example, a proprietary device (e.g., a NVDIMM-specific device) to optimize the cost and/or performance of the format. Furthermore, although shown with only a single non-volatile memory slot 130 and a single non-volatile memory device 140 in FIG. 1, the NVDIMM 100 in other embodiments can include more than one non-volatile memory slot 130 configured to receive (e.g., be compatible with) and connect one or more types of non-volatile memory devices 140 and/or one or more types of storage media.

Figure 2:
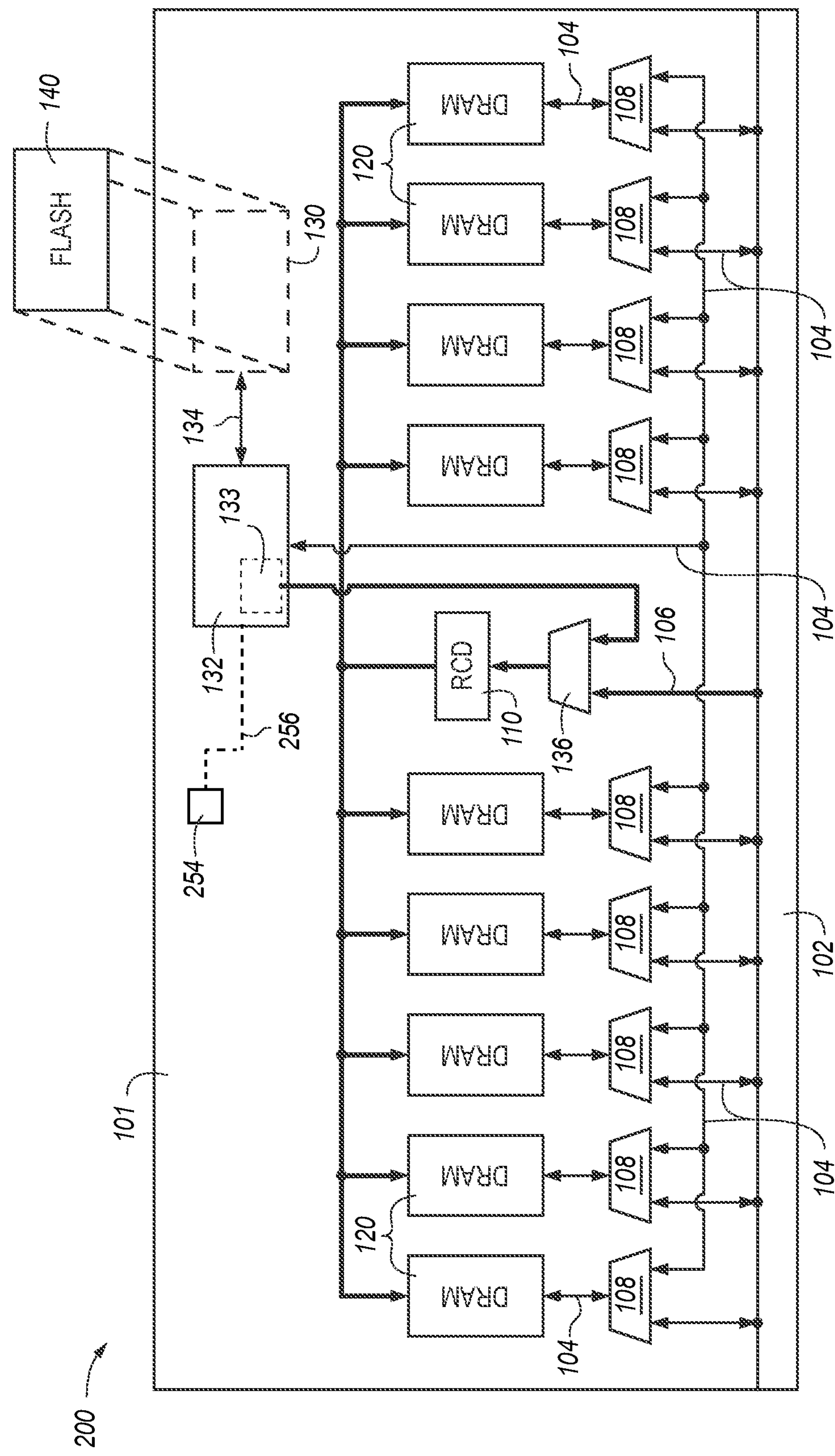
FIG. 2 is a schematic diagram of a non-volatile dual in-line memory module configured in accordance with another embodiment of the present technology.

FIG. 2 is a schematic diagram of a non-volatile dual in-line memory module (NVDIMM) 200 configured in accordance with another embodiment of the present technology. The illustrated NVDIMM 200 is similar to the NVDIMM 100 of FIG. 1 with the exception that the NVDIMM 200 of FIG. 2 includes additional circuitry and/or communication line(s) 256 connecting dedicated hardware 254 (e.g., a dedicated hardware button) on the NVDIMM 200 to the controller 132. Although illustrated on the NVDIMM 200 in FIG. 2, the dedicated hardware 254 can be hardware external to the NVDIMM 200 (e.g., hardware located on the host device) in other embodiments. As described in greater detail below, the dedicated hardware 254, when activated, can be configured to invoke a backup (e.g. a copying and/or a moving) of the contents of the DRAM memories 120 to be stored on the non-volatile memory device 140.

As will be appreciated by one with ordinary skill in the art, the removable nature of the non-volatile memory device 140 from the NVDIMM 100 in accordance with embodiments of the present technology overcomes several shortcomings of the prior art. For example, relocating memory modules within a conventional NVDIMM while power is supplied to the conventional NVDIMM is not practicable because the pins of the edge connection 102 (e.g., high-voltage and ground pins) are located too near one another such that tipping a memory module out of its slot could cause a short that could damage or destroy the memory module. As a result, the memory modules in conventional NVDIMMs cannot be safely hot-swapped, meaning that conventional NVDIMMs must first be powered down before they can be removed and/or relocated.

In contrast and as noted above, NVDIMMs in accordance with embodiments of the present technology include one or more non-volatile memory slots (e.g., non-volatile memory slots 130; FIGS. 1 and 2), which permit non-volatile memory devices (e.g., non-volatile memory devices 140; FIGS. 1 and 2) to be hot-swapped between (e.g., removed from and/or relocated to) non-volatile memory slots of the same and/or other NVDIMM(s) without needing to power down the NVDIMM(s) (or the host device(s) attached thereto). Thus, for example, when a host device attached to a NVDIMM configured in accordance with embodiments of the present technology has hung and/or components of the host device have hung, a user can relocate (e.g., transport) DRAM content (e.g., content backed up and/or stored on non-volatile memory device(s) 140) on the NVDIMM to another non-volatile memory slot (e.g., a different NVDIMM of the same or a different host device) via one or more non-volatile memory devices (e.g., after invoking a backup of the DRAM content with dedicated hardware 254). As a result, the user is able to access the DRAM content sooner than the hung host device can be powered off and/or rebooted.

Additional advantages of NVDIMMs configured in accordance with embodiments of the present technology are evident. For example, corrupt and/or inoperable non-volatile memory devices (e.g. non-volatile memory devices 140) in some embodiments can quickly and conveniently be removed, disposed of, and/or replaced, thereby extending the life of the corresponding NVDIMM. In these and other embodiments, a user can easily upgrade an NVDIMM (e.g., by swapping out a non-volatile memory device with a more recent, improved, and/or technologically advanced non-volatile memory device to, for example, increase the non-volatile memory device storage capacity, improve a NVDIMM's backup and/or restore speeds, etc.). In these and still other embodiments, NVDIMMs configured in accordance with embodiments of the present technology can quickly be customizable to a particular user's need(s). For example, NVDIMMs in some embodiments can include a universal non-volatile memory slot (e.g., a non-volatile memory slot 130) and/or one or more non-volatile memory slots (e.g., one or more non-volatile memory slots 130) compatible with a one or more types non-volatile memory devices and/or types of storage media. Thus, a user is provided the flexibility to use, for example, a UFS non-volatile memory device in a situation requiring fast write speeds and/or quick backup routines. The same user can then swap, for example, the UFS non-volatile memory device for a high storage capacity non-volatile memory device in a situation requiring backup of large amounts of data (e.g., in a situation requiring multiple dumps of DRAM content to a single non-volatile memory device).

Furthermore, the non-volatile memory device 140 can be designed to optimize the cost, performance, and/or security of the format. In some embodiments, for example, the non-volatile memory slot (e.g., non-volatile memory slot 130) can be configured to receive (e.g., be compatible with) only NVDIMM-specific non-volatile memory devices and/or only party-specific non-volatile memory devices (e.g., to prevent end users from using off-the-shelf and/or third party parts in addition to or in lieu of NVDIMM-specific and/or party-specific non-volatile memory devices). For example, non-volatile memory slots in accordance with some embodiments of the present invention can be proprietary and/or designed to receive NVDIMM-specific and/or party-specific non-volatile memory devices with specific characteristics (e.g., size, shape, type of storage media, technical specifications, etc.). In these and other embodiments, NVDIMM-specific and/or party-specific non-volatile memory devices can be encrypted (e.g., with a hardware key, a party-supplied asymmetric key, a hash key, and/or other encryption methods) such that the non-volatile memory devices are linked to and/or are operable with only an individual NVDIMM and/or group of NVDIMMs having specific characteristics (e.g., a specific manufacturer, a specific vendor, specific technical specifications, etc.). In some embodiments, encryption of the NVDIMM-specific and/or party-specific non-volatile memory devices can be implemented, for example, directly in the NVDIMM-specific and/or party-specific non-volatile memory devices (e.g., during a backup operation from volatile memories of a NVDIMM to the non-volatile memory device(s)). In other embodiments, the NVDIMM-specific and/or party-specific non-volatile memory devices can be encrypted by a user and/or another party (e.g., a manufacturer, a vendor, or other party) at various locations (e.g., at a specific site before and/or after the non-volatile devices are sold to end-users, before and/or after refurbishing, etc.) and/or using various techniques (e.g., using other NVDIMMs, other processes (installation process, recognition process, restore process, etc.) of the NVDIMM, and/or other encryption methods). In these and still other embodiments, data on the non-volatile memory devices can be encrypted in a similar manner. For example, data on the non-volatile memory devices can be encrypted (e.g., with a hardware key, an asymmetric key, a hash key, and/or other encryption methods) such that the non-volatile memory device is only operable with a particular NVDIMM and/or group of NVDIMMs having particular characteristics (e.g., a particular owner, a particular location, a matching key, corresponding decryption code and/or information, etc.).

Figure 3:
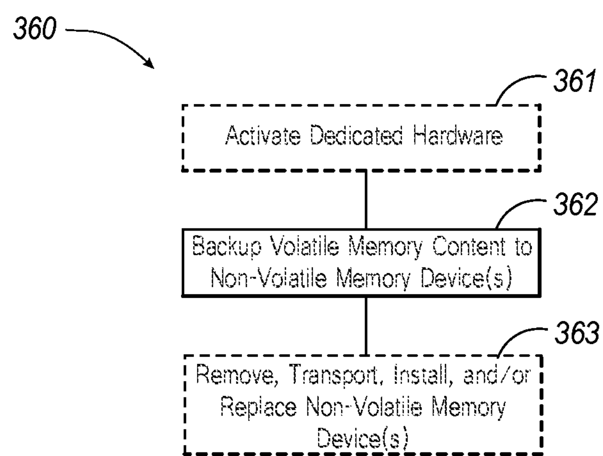
FIG. 3 is a flow diagram illustrating a method of backing up content stored on a non-volatile dual in-line memory module in accordance with embodiments of the present technology.

FIG. 3 is a flow diagram illustrating a routine 360 directed to a method of backing up content stored on an NVDIMM (e.g., NVDIMM 100 and/or NVDIMM 200; FIGS. 1 and/or 2) in accordance with embodiments of the present technology. Blocks 361 and 363 are illustrated in dashed lines in FIG. 3 to represent that these blocks correspond to particular embodiments of the present technology (e.g., embodiments in accordance with NVDIMM 200 of FIG. 2) and/or are optional blocks in the routine 360. In embodiments including dedicated hardware (e.g., dedicated hardware 254; FIG. 2) the routine 360 can begin at block 361 by activating the dedicated hardware and can proceed to block 362 to backup (e.g., copy and/or move) volatile memory content to one or more non-volatile memory devices. For example, a user can activate (e.g., mechanically actuate or electrically signal) dedicated hardware (e.g., dedicated hardware 254) on a NVDIMM (e.g., NVDIMM 200) and/or on a host device connected to the NVDIMM to invoke a backup (e.g. a copying and/or a moving) of content stored on one or more volatile memories (e.g., one or more DRAM memories 120; FIG. 2) of the NVDIMM. When activated, the dedicated hardware can direct a controller (e.g., controller 132; FIG. 2) on the NVDIMM to copy and/or move (e.g., all or a subset of) content stored on one or more volatile memories of the NVDIMM to one or more non-volatile memory devices (e.g., one or more non-volatile memory devices 140; FIGS. 1 and 2) connected to the controller via non-volatile memory slot(s) (e.g., non-volatile memory slot(s) 130; FIG. 2) of the NVDIMM.

Alternatively, the routine 360 can begin at block 362 by backing up (e.g., copying and/or moving) volatile memory content to one or more non-volatile memory devices. For example, a controller (e.g., controller 132; FIGS. 1 and/or 2) of a NVDIMM (e.g., NVDIMM 100 and/or NVDIMM 200; FIGS. 1 and/or 2) can backup (e.g., all or a subset of) content stored on one or more volatile memories (e.g., one or more DRAM memories 120; FIGS. 1 and/or 2) of the NVDIMM to one or more non-volatile memory devices connected to the controller via non-volatile memory slot(s) (e.g., non-volatile memory slot(s) 130; FIGS. 1 and/or 2) of the NVDIMM. In some embodiments, the controller can back up the volatile memory content automatically (e.g., before and/or after a specific amount of time has elapsed; when the volatile memory content occupies a specific amount of the storage capacity of one or more volatile memories; before shutting down the NVDIMM and/or a host device connected to the NVDIMM; after starting up the NVDIMM and/or the host device; when the host device has hung and/or components of the host device have hung; before and/or after specified tasks of the NVDIMM and/or of the host device; before and/or after the NVDIMM and/or the host device detect that a non-volatile memory device has become or is about to become corrupted and/or inoperable; when the controller detects a loss of power to the NVDIMM; or before, during, and/or after other triggering events). In these and other embodiments, the controller can wait to backup volatile memory content to one or more non-volatile memory devices until directed (e.g., by a user and/or the host device).

As illustrated in FIG. 3, the routine 360 can optionally start at and/or proceed to block 363 to remove, transport, install, and/or replace a non-volatile memory device. For example, a user can remove one or more non-volatile memory devices (e.g., one or more non-volatile memory devices 140; FIGS. 1 and/or 2) out of one or more non-volatile memory slots (e.g., one or more non-volatile memory slots 130; FIGS. 1 and/or 2) of a first NVDIMM (e.g., NVDIMM 100 and/or NVDIMM 200; FIGS. 1 and/or 2) before and/or after backing up volatile memory content of the first NVDIMM to the one of more non-volatile memory devices. In some of these embodiments, the user can transport and/or install the one or more non-volatile memory devices to the same and/or different non-volatile memory slot(s) (e.g., the same and/or different non-volatile memory slot(s) 130) of the first and/or different NVDIMM(s) (e.g., NVDIMM(s) 100 and/or NVDIMM(s) 200; FIGS. 1 and/or 2). In these and other embodiments, the user can replace the one or more non-volatile memory devices with the same and/or different non-volatile memory device(s) (e.g., the same and/or different non-volatile memory device(s) 140; FIGS. 1 and/or 2) in the same and/or different non-volatile memory slot(s) (e.g., the same and/or different non-volatile memory slot(s) 130; FIGS. 1 and/or 2) of the first NVDIMM.

Figure 4:
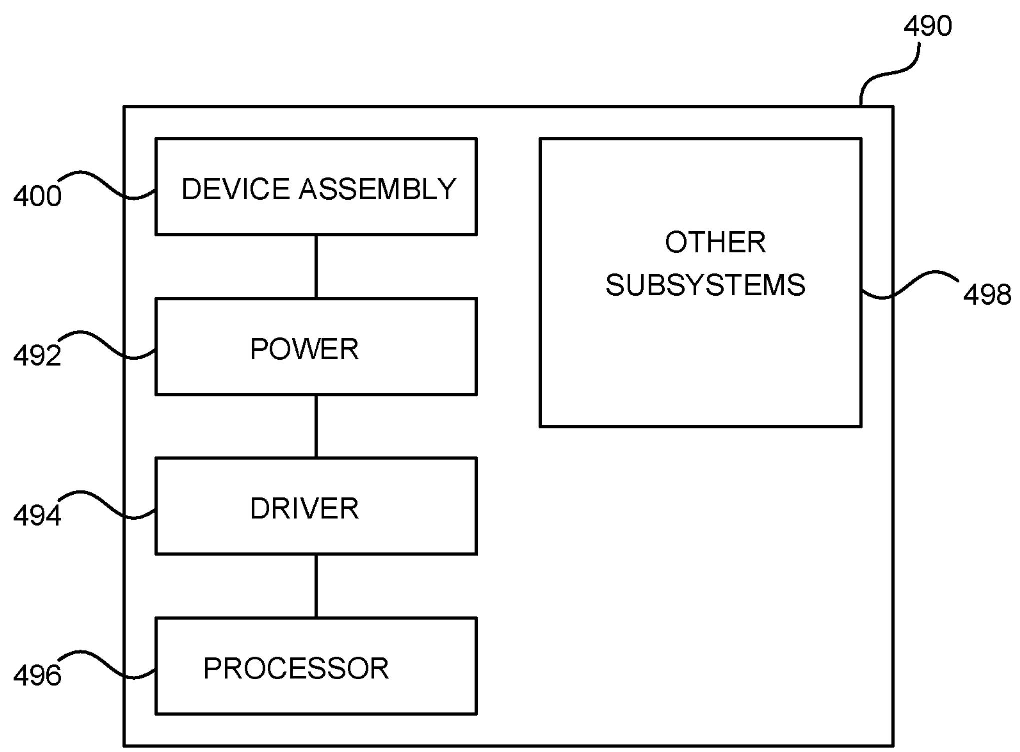
FIG. 4 is a schematic view of a system that includes a non-volatile dual in-line memory module configured in accordance with embodiments of the present technology.

FIG. 4 is a schematic view a system that includes a non-volatile dual in-line memory module configured in accordance with embodiments of the present technology. Any one of the foregoing memory devices described above with reference to FIGS. 1-3 can be incorporated into any of a myriad of larger and/or more complex systems, a representative example of which is system 490 shown schematically in FIG. 4. The system 490 can include a memory device assembly 400, a power source 492, a driver 494, a processor 496, and/or other subsystems and components 498. The memory device assembly 400 can include features generally similar to those of the NVDIMM devices described above with reference to FIGS. 1-3, and can, therefore, include various features of removable storage. The resulting system 490 can perform any of a wide variety of functions, such as memory storage, data processing, and/or other suitable functions. Accordingly, representative systems 490 can include, without limitation, hand-held devices (e.g., mobile phones, tablets, digital readers, and digital audio players), computers (e.g., workstations, servers, etc.), vehicles, appliances, and other products. Components of the system 490 may be housed in a single unit or distributed over multiple, interconnected units (e.g., through a communications network). The components of the system 490 can also include remote devices and any of a wide variety of computer readable media.

From the foregoing, it will be appreciated that specific embodiments of the invention have been described herein for purposes of illustration, but that various modifications may be made without deviating from the disclosure. For example, NVDIMMs configured in accordance with embodiments of the present technology can include more or less volatile memories and/or more or less multiplexers than illustrated in FIGS. 1 and 2. In addition, NVDIMMs configured in accordance with embodiments of the present technology can include other and/or different circuitry, communication lines, and/or arrangements than those illustrated in FIGS. 1 and 2. Furthermore, certain aspects of the new technology described in the context of particular embodiments may also be combined or eliminated in other embodiments. Moreover, although advantages associated with certain embodiments of the new technology have been described in the context of those embodiments, other embodiments may also exhibit such advantages and not all embodiments need necessarily exhibit such advantages to fall within the scope of the technology. Accordingly, the disclosure and associated technology can encompass other embodiments not expressly shown or described.

I claim:

1. A non-volatile dual in-line memory module (NVDIMM) comprising:

one or more volatile memories;

a first non-volatile memory slot;

a second non-volatile memory slot; and a controller operatively connected concurrently to the one or more volatile memories, to the first non-volatile memory slot, and to the second non-volatile memory slot, wherein the first non-volatile memory slot is configured to operatively connect a first removable non-volatile memory device to the controller, wherein the second non-volatile memory slot is configured to operatively connect a second removable non-volatile memory device to the controller, and wherein at least one of the first non-volatile memory slot and the second non-volatile memory slot is further configured to eject the corresponding one of the first and second removable non-volatile memory devices while power is supplied thereto.

2. The NVDIMM of claim 1, wherein at least one of the first non-volatile memory slot and the second non-volatile memory slot is further configured to receive the corresponding one of the first and second removable non-volatile memory devices while power is supplied thereto.

3. The NVDIMM of claim 1, wherein at least one of the first non-volatile memory slot and the second non-volatile memory slot is further configured to receive only removable non-volatile memory devices with a proprietary size, a proprietary shape, and/or proprietary technical specifications.

4. The NVDIMM of claim 1, wherein at least one of the first non-volatile memory slot and the second non-volatile memory slot is further configured to operatively connect to the controller only removable non-volatile memory devices of a particular manufacturer, a particular vendor, and/or a particular user.

5. The NVDIMM of claim 1, wherein the controller is further configured to encrypt content backed up to at least one of the first non-volatile memory device and the second removable non-volatile memory device.

6. The NVDIMM of claim 1, wherein the controller is further configured to restore content to the one or more volatile memories only from removable non-volatile memory devices containing content encrypted by the controller of the NVDIMM.

7. The NVDIMM of claim 1, wherein at least one of the first non-volatile memory slot and the second non-volatile memory slot is further configured to receive and/or connect to the controller a secure digital (SD) card, an universal flash storage (UFS) card, a compact flash (CF) card, a MultiMediaCard (MMC), a memory stick, a SmartMedia card, a xd-Picture card, a smart card, and/or a universal serial bus device.

8. The NVDIMM of claim 1, wherein the controller, to prepare at least one of the first removable non-volatile memory device and the second removable non-volatile memory device for removal from the non-volatile memory slot, is configured to copy the content on the one or more volatile memories to the corresponding one of the at least one of the first removable non-volatile memory device and the second removable non-volatile memory device.

9. The NVDIMM of claim 1, wherein the controller, to prepare at least one of the first removable non-volatile memory device and the second removable non-volatile memory device for removal from the non-volatile memory slot, is configured to move the content on the one or more volatile memories to the corresponding one of the at least one of the first removable non-volatile memory device and the second removable non-volatile memory device.

10. The NVDIMM of claim 1, further comprising dedicated hardware configured to direct the controller to back up the content on the one or more volatile memories to at least one of the first and second removable non-volatile memory devices operatively connected to the controller.

11. A system comprising:

a first removable non-volatile memory device;

a second removable non-volatile memory device; and a non-volatile dual in-line memory module (NVDIMM) including— one or more volatile memories, a first non-volatile memory slot;

a second non-volatile memory slot; and a controller operatively connected concurrently to the one or more volatile memories, to the first non-volatile memory slot, and to the second non-volatile memory slot, wherein the first non-volatile memory slot is configured to operatively connect the first removable non-volatile memory device to the controller, wherein the second non-volatile memory slot is configured to operatively connect the second removable non-volatile memory device to the controller, and wherein at least one of the first non-volatile memory slot and the second non-volatile memory slot is further configured to operatively disconnect the corresponding one of the first and second removable non-volatile memory devices from the controller while power is supplied thereto.

12. The system of claim 11, wherein at least one of the first non-volatile memory slot and the second non-volatile memory slot is further configured to operatively connect the corresponding one of the first and second removable non-volatile memory devices to the controller while power is supplied to the NVDIMM.

13. The system of claim 11, wherein at least one of the first removable non-volatile memory device and the second removable non-volatile memory device has a size, a shape, and/or technical specifications not compliant with any memory industry standard.

14. The system of claim 11, wherein at least one of the first removable non-volatile memory device and the second removable non-volatile memory device is a secure digital (SD) card, an universal flash storage (UFS) card, a compact flash (CF) card, a MultiMediaCard (MMC), a memory stick, a SmartMedia card, a xd-Picture card, a smart card, or a universal serial bus device.

15. The system of claim 11, wherein at least one of the first removable non-volatile memory device and the second removable non-volatile memory device comprises NAND flash storage media.

16. The system of claim 11, wherein the controller is further configured to encrypt content copied onto at least one of the first removable non-volatile memory device and the second removable non-volatile memory device such that the copied content can only be read by the NVDIMM.

17. The system of claim 11, wherein— at least one of the first removable non-volatile memory device and the second removable non-volatile memory device is encrypted by a manufacturer, vendor, and/or owner such that it can only be authenticated by and/or operated with a select group of NVDIMMs; and the NVDIMM is within the select group of NVDIMMs.

18. The system of claim 11, further comprising dedicated hardware configured to direct the controller to back up the content on the one or more volatile memories to at least one of the first and second removable non-volatile memory devices operatively connected to the controller.

* * * * *